Dec. 5, 1950     J. F. HART     2,532,909
WEARING APPAREL SUPPORT
Filed May 13, 1946

INVENTOR.
JAMES F. HART,
BY Edwin D. Jones
ATTORNEY.

Patented Dec. 5, 1950

2,532,909

UNITED STATES PATENT OFFICE 2,532,909

WEARING APPAREL SUPPORT

James F. Hart, Bishop, Calif., assignor of one-half to Alberta M. Talmadge, Bishop, Calif.; Jo Ann Hart administratrix of said James F. Hart, deceased Application May 13, 1946, Serial No. 669,313

1 Claim. (Cl. 224—42.1)

My invention relates to and has for a purpose the provision of a support adapted for application to a passenger automobile for suspending within the body thereof, through the use of conventional clothes hangers of wearing apparel such as coats, trousers, dresses, and whereby the apparel can be carried in the automobile without rumpling.

It is also a purpose of my invention to provide an apparel support for use in automobiles, which is extensible automatically to fit an automobile body of any width, and in such manner that it is self-supporting in spanning relation to the interior of the body to form a bracket from which clothes can be suspended by hangers and at full length vertically.

I will describe only one form of apparel support embodying my invention and will then point out the novel features thereof in the claim.

Figure 1:
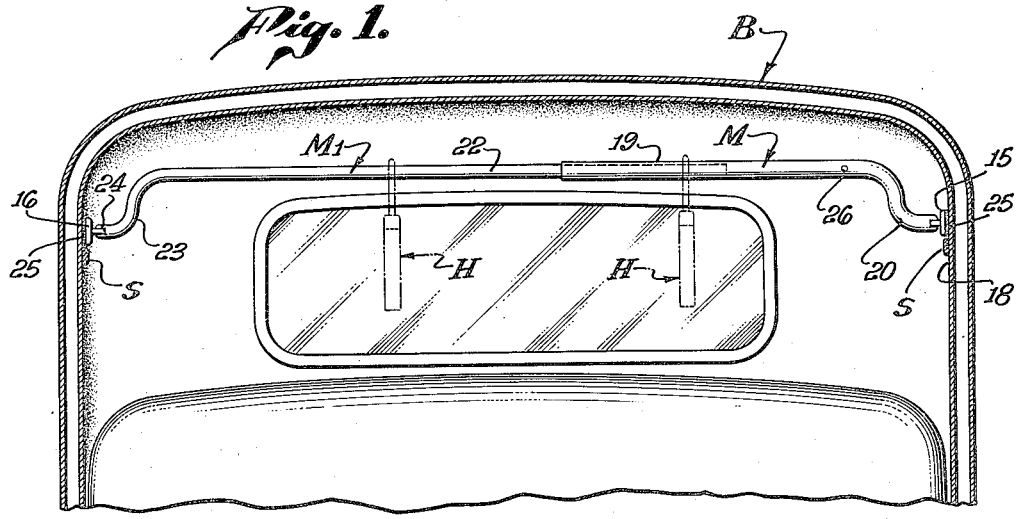
Fig. 1 is a view showing in side elevation, one form of apparel support embodying my invention in applied position to the body of an automobile, and wherein the latter is shown in transverse fragmentary section, and looking to the rear of the car.

Having specific reference to the drawings, my invention, in its present embodiment, comprises a pair of members M and M1 which are telescopically associated one with the other, and provided with feet 15 and 16 respectively which, under the action of an extensible spring 17, are urged to an extended position to spread the feet relatively and into engagement with the inner side walls 18 of an automobile body B.

The member M embodies a linear tubular metal portion 19 and a laterally bent terminal portion 20 to which the foot 15 is fixed. The lineal and bent portions may be in the form of a pipe, and the foot 15 may be provided with a boss 21 fixed to the adjacent end of the bent portion 20.

The member M1 may be constructed from a metal rod and to provide a lineal portion 22 telescopically received in the linear portion 19 of the member M, and a laterally bent portion 23 having the same form as the portion 20 and rigidly connected to the foot 16 by a boss 24.

The feet 15 and 16 are of identical construction, and each comprises a rectangular metal plate to the outer face of which may be secured a covering strip 25 of felt or sponge rubber.

Figure 2:
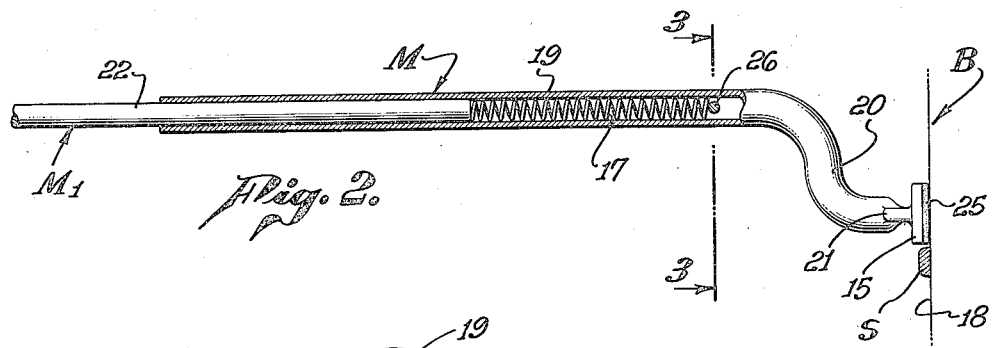
Fig. 2 is an enlarged fragmentary sectional view, partly in elevation, of the support shown in Fig. 1, and as applied to a portion of the automobile body.

As shown in Fig. 2 the linear portion 19 of the member M contains the spring 17, and this spring is interposed between a pin 26 extending transversely through the member M, and the confronting end of the lineal portion 22 of the member M1. The spring is of such tension as to urge the member M1 outwardly of the member M so as to constantly tend to extend the two members in opposite directions, and thereby spread the feet 15 and 16 one from the other.

In practice, my apparel support can be quickly and easily applied to the interior of the automobile body B, by first placing one of the feet 15 or 16 horizontally against one side wall of the body, preferably above and in contact with the usual metal trim strip S which extends along the sides of the body above the side windows, and then telescoping the linear portions 19 and 22 against the tension of the spring 17, until the other foot 15 or 16 can be positioned above the trim strip S at the opposite side of the body, when the linear portions are released to allow the foot to be forced by the spring against the other body wall.

Figure 3:
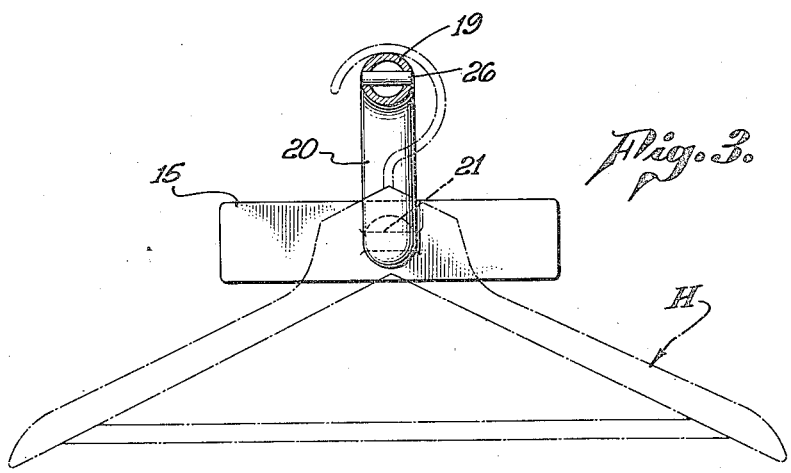
Fig. 3 is an enlarged transverse sectional view taken on the line 3—3 of Fig. 2 and showing a clothes hanger thereon.

With the two members so extended the two feet 15 and 16 are held firmly against the body side walls, and the linear portions 19 and 22 extended across the car body adjacent the top thereof. With the support so applied, wearing apparel placed on conventional hangers H, such as those shown in Figs. 1 and 3, may be suspended in parallel relation from the lineal portions 19 and 22, and fully extended because of the height of the support from the floor of the body B attained by virtue of the curved portions 20 and 23 positioning the linear portions adjacent the top of the body. In this manner many garments can be suspended from the support in fully extended positions, and thus carried without rumpling, so that upon reaching a destination, the garments are in the same condition as when originally placed on the support.

The extensibility of my support renders it applicable to automobile bodies of varying width, and the feet because of their elongated form and being positioned above and in contact with the trim strip, causes the latter to assist the spring in sustaining the feet in fixed positions on the body, and the support as a whole fixed at an elevation transversely of the body. The rubber or felt strips 25 prevent marring of the interior upholstering of the automobile body, and also provide friction surfaces to prevent possible slipping of the feet, particularly where the car body is without the metal trim strips S.

My apparel support may be easily and quickly dismounted, and without removing the garments and their hangers therefrom if desired, by forcing the linear portions together until one foot or the other is moved free of the car body, when it may be moved to such a position that it can be removed through one of the doorways of the body.

Although I have herein shown and described only one form of wearing apparel support for automobiles embodying my invention, it is to be understood that various changes and modifications may be made therein without departing from the spirit of my invention and the spirit and scope of the appended claim.

I claim:

An apparel support adapted for use in the body of an automobile including; a pair of elongated elements circular in cross section and telescoped one within the other, said elements having linear portions and downwardly and laterally turned portions at the distal ends of the linear portions, and feet carried by the free ends of said downwardly turned portions so as to be disposed in planes intersecting the planes of said downwardly turned portions, one of said elements being tubular and having an abutment fixed therein between the ends thereof, and a coiled expansible spring housed within said tubular element and bearing at its ends against the abutment and the confronting end of the other element for urging the two elements apart to maintain said feet in engagement with the vertical side walls of an automobile body with the downturned portions extending upwardly from the feet so that the linear portions will be arranged above the downward portions and adjacent the top of the body, all of said portions being transversely rigid so that the weight of articles supported thereon will be transmitted downwardly and outwardly to said feet to force the latter into more firm engagement with the body walls.

JAMES F. HART.

REFERENCES CITED

The following references are of record in the file of this patent:

UNITED STATES PATENTS

| Number | Name | Date |
|---|---|---|
| 468,987 | Fowler et al. | Feb. 16, 1892 |
| 520,584 | Turner | May 29, 1894 |
| 937,376 | Masden | Oct. 19, 1909 |
| 988,200 | Logsdon | Mar. 28, 1911 |
| 1,299,556 | Creceluis | Apr. 8, 1919 |
| 1,425,247 | Galbreath | Aug. 8, 1922 |
| 1,800,030 | Reynolds | Apr. 7, 1931 |
| 2,253,473 | Fellers et al. | Aug. 19, 1941 |